United States Patent [19]

Duchane et al.

[11] Patent Number: 4,555,313

[45] Date of Patent: Nov. 26, 1985

[54] METHOD OF FORMING A CONTINUOUS POLYMERIC SKIN ON A CELLULAR FOAM MATERIAL

[75] Inventors: David V. Duchane; Barry L. Barthell, both of Los Alamos, N. Mex.

[73] Assignee: The United States of America as represented by the United States Department of Energy, Washington, D.C.

[21] Appl. No.: 435,796

[22] Filed: Oct. 21, 1982

[51] Int. Cl.[4] .......................... C25D 1/08; B05D 5/00; B22D 19/02

[52] U.S. Cl. .......................................... 204/3; 164/46; 204/9; 204/12; 427/244; 427/383.1; 427/404; 427/412.3

[58] Field of Search ...................... 427/243, 244, 383.1, 427/404, 412.3; 264/221; 204/3, 11, 9, 12; 164/46

[56] References Cited

U.S. PATENT DOCUMENTS 3,464,898  9/1969  Norris ..................................... 204/9
4,302,311  11/1981  Lowe et al. ..................... 204/192 R
4,430,451  2/1984  Young et al. ......................... 521/64

OTHER PUBLICATIONS

Young et al., "Preparation of Multishell ICF Target Plastic Foam Cushion Materials by Thermally Induced Phase Inversion Processes", *J. Vac. Sci. Technol.*, 20(4), Apr. 1982, pp. 1094–1097.

Barthell et al., "Vacuum Deposition of High Quality Metal Films on Porous Substrates", *J. Vac. Sci. Technol.*, 20(4), Apr. 1982, pp. 1341–1344.

*Primary Examiner*—Evan K. Lawrence
*Attorney, Agent, or Firm*—William A. Eklund; Paul D. Gaetjens; Judson R. Eightower

[57] ABSTRACT

Hydrophobic cellular material is coated with a thin hydrophilic polymer skin which stretches tightly over the outer surface of the foam but which does not fill the cells of the foam, thus resulting in a polymer-coated foam structure having a smoothness which was not possible in the prior art. In particular, when the hydrophobic cellular material is a specially chosen hydrophobic polymer foam and is formed into arbitrarily chosen shapes prior to the coating with hydrophilic polymer, inertial confinement fusion (ICF) targets of arbitrary shapes can be produced by subsequently coating the shapes with metal or with any other suitable material. New articles of manufacture are produced, including improved ICF targets, improved integrated circuits, and improved solar reflectors and solar collectors. In the coating method, the cell size of the hydrophobic cellular material, the viscosity of the polymer solution used to coat, and the surface tensin of the polymer solution used to coat are all very important to the coating.

10 Claims, No Drawings

METHOD OF FORMING A CONTINUOUS POLYMERIC SKIN ON A CELLULAR FOAM MATERIAL

BACKGROUND OF THE INVENTION

The present invention relates generally to methods of forming coated hydrophobic foams and other cellular materials, to articles of manufacture produced from those coated foams and other cellular materials, and to methods of production thereof and relates more particularly to coated poly(4-methyl-1-pentene), to articles of manufacture produced from that foam, and to methods of producing the coated foam and the articles of manufacture. This invention is a result of a contract with the Department of Energy (Contract No. W-7405-ENG-36).

Closed cell foams have in the past been used for various purposes (e.g. as insulation); and polymer coatings have been applied thereto; but such coating has not been done for the purpose of smoothing the surface of the foam.

Targets used for inertial confinement fusion (i.e., ICF) studies often are in the shape of spheres or cylinders and are hollow. They may either be made of glass or metal, but they must be strong enough to contain a gaseous fuel at considerable pressure, be free from pinholes which would allow the fuel to leak out, and be uniform on a macroscopic and microscopic scale to ensure a symmetrical and efficient implosion when they are detonated.

ICF targets have generally been made in one of two ways. In one way, they have been blown by causing a gaseous expansion within a molten material and then solidifying the hollow sphere; or in a second way, they can be produced on a shaped mandrel. In the blowing process, the target material has been confined to glass and a few other materials; and the blown targets are limited in shape to spheres or substantially sphere-shaped structures. On the other hand, using the second method, targets can be produced in a wide variety of shapes from a wide range of materials by depositing the wall material on a preformed mandrel and then dissolving out the mandrel. The deposition can be carried out, for example, by electroplating, physical vapor deposition (PVD), or chemical vapor deposition (CVD) techniques. However, removal of the mandrel has generally been a tedious and time-consuming process, especially when the mandrel consisted of a metal to be dissolved away through a small hole in an overcoated shell. Since polymers are soluble in many solvents which do not attack the usual ICF target shell materials, particularly metals, polymers would be ideal materials for use as mandrels if problems arising from their tendency to swell before they dissolve in the solvent could be overcome.

A low-density microcellular foam of poly(4-methyl-1-pentene), referred to as TPX, was produced and was the subject of Los Alamos report LA-UR-81-2722, "Preparation of Multishell ICF Target Plastic Foam Cushion Materials by Thermally Induced Phase Inversion Processes," A. T. Young et al. which also was published as J. Vac. Sci. Technol., 20(4), April 1982, pages 1094–1097, that foam is also the subject of U.S. Pat. No. 4,430,451 to Ainslie T. Young et al., wherein the foam is described as being particularly useful for forming targets for inertial confinement fusion. Articles made from the foam were machined to tolerances of 0.0001 inch, although the densities of the fragile foams are low (about 10 to about 100 mg/cc) and the cell sizes are small (about 10 to about 30 $\mu$m). Articles made from the foam can be machined if the reinforcing material has not been removed. After machining, the reinforcing material can be removed by leaching the article in a liquid which dissolves the reinforcing material but not the TPX. As a result of the leaching process, an open-cell foam is produced. If the reinforcing material is removed at this step and if then the foam is coated with metal, the metal surface will have irregularities due to the open cells. On the other hand, if the reinforcing material is left within the foam during the metal coating step (particularly if that step involves use of a vacuum), it is almost certain that the resulting outgassing of the reinforcing material would prevent formation of a continuous metal coating or would fracture any metal coating that might form. It is possible that leaving the material inside would even cause the structure to disintegrate.

Therefore, despite what has been known in the prior art, a need existed until now for a method for producing a very smooth layer of metal on a cellular structure having a chosen arbitrary shape and being useful, for example, as an ICF target.

SUMMARY OF THE INVENTION

The object and purpose of this invention is to provide a method of forming a smooth continuous polymeric layer on the outer surface of a cellular foam material.

A further object of this invention is to provide a method of forming an article of manufacture comprising a foam formed from a hydrophobic polymer and having an average cell size less than about 500 $\mu$m and being coated with a very thin (i.e., about 20 to about 50 $\mu$m) skin of a hydrophilic polymer.

Yet another object of this invention is to provide a method of forming an article of manufacture comprising the thin-skinned foam described above and having also an exterior layer over the hydrophilic polymer skin of metal or any substance which can be made to form a self-sustaining, continuous layer on the surface of the polymer, which is not affected by the dissolving agents used in any subsequent step in the process, and which does not lead to destruction of the substrate material when the metal (or other material) is being applied, and wherein the exterior layer is smoother than has been possible in arbitrarily shaped articles of manufacture previously produced.

A still further object of this invention is to provide a method for making ICF targets of arbitrarily chosen shapes and having an interior layer of cellular material and an exterior layer of metal with a smoothness that has not previously been possible in the prior art on arbitrarily chosen shapes.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the method of this invention of forming a smooth, thin skin of hydrophilic coating polymer on the surface of a hydrophobic foam comprises: (a) coating the outer surface of a hydrophobic foam or other hydrophobic cellular material having an average cell size less than 500 μm in a wetting solution consisting essentially of the coating polymer and water, wherein the wetting solution has a surface tension within the range from about 35 to about 55 dynes/cm and a viscosity within the range from about 100 to about 3000 centipoises (cP), (b) removing the foam or other cellular material from the wetting solution and allowing the excess wetting solution to drain away from the foam, and (c) drying the wetted surface of said cellular material to remove the water therefrom and thereby form a smooth continuous layer of said hydrophilic polymer on the surface of said cellular material.

The method of the invention permits smooth, pore-free coatings (as described below) to be applied for the first time to the surfaces of foams; thus, the coatings do not have the pores that the foams themselves have.

It is believed that the coating process is applicable to hydrophobic cellular substances in general and not only to foams, provided that the cell sizes are smaller than 500 μm.

In a preferred embodiment, the foam which is coated is formed from poly(4-methyl-1-pentene) and the wetting solution consists essentially of polyvinyl alcohol and water.

Also according to the invention, a method of producing an arbitrarily shaped structure having a smooth metal exterior layer comprises: (a) forming (i.e., casting in a mold, machining, or cutting) a foam made of a hydrophobic polymer material or another hydrophobic cellular material and having a cell size less than 500 μm into a chosen shape; (b) coating that shape by the method recited above in a wetting solution consisting essentially of a hydrophilic polymer material and water; (c) coating the polymer-coated structure with a layer of metal by any process which produces a smooth metal surface; and (c) then optionally removing the foam or other cellular material, if desired, by dissolving it in a suitable solvent. Also, according to the invention, if desired, the foam can be left within the metal-coated target and the foam-filled structure can be used as an ICF target, provided that the foam does not occupy an undue amount of space within the target. In a preferred embodiment, for this use, a foam made of poly(4-methyl-1-pentene) (sometimes referred to as TPX) which is microcellular and low density and which is made as described below is particularly suitable for producing ICF targets.

The method of the invention produces a new article of manufacture comprising a hydrophobic foam or other hydrophobic cellular material having a cell size less than about 500 μm and having a very thin (about 20–50 μm thick) smooth coating of hydrophilic polymer thereon. In a preferred embodiment, the article of manufacture can be of any arbitrarily chosen shape, as desired. Further according to the invention, a new article of manufacture comprises an article as described above and including also a smooth exterior coating of a further material described below (for example, metals, semiconductors, or functional organic coatings) and having any arbitrarily chosen shape as desired. In a preferred embodiment, such an article is used as an ICF target and has a smoother metal surface than has previously been obtainable in the prior art.

The method of the invention may also be used to produce an integrated circuit located on a hydrophobic foam substrate which has a cell size less than about 500 μm, wherein a smooth metal layer has been deposited over a hydrophilic polymer skin deposited over the foam. The foam provides thermal insulation and thus provides an improved integrated circuit.

By using the method of the invention, a variety of new and useful articles of manufacture are possible. These are all characterized by being in any artibrarily chosen shape and by having a very smooth outer surface, which can either be (1) the hydrophilic polymer used in the wetting solution which stretches very tightly over a foam or other cellular material or alternatively (2) a further layer of either metal(s) or semiconductor(s) or functional organic coating(s). If the article is to be used as an ICF target, the foam can, if desired, be removed from the inside of the target or alternatively it can be left in place if the foam or other cellular material that has been coated has a low enough density. Such a suitable foam is described in the reference by A. T. Young et al., recited above. Although in the prior art it has been possible by levitating methods to obtain very smooth spherical metal-coated bodies, (as described, for example, in U.S. Pat. No. 4,302,311 to Arthur T. Lowe et al.), it has not been possible to obtain such smooth metal surfaces on cellular materials.

DESCRIPTION OF THE PREFERRED EMBODIMENTS

In the method of the invention, the foam or other cellular material which is to be coated is hydrophobic (i.e., it is material which would not be wet well by water) and has a cell size less than about 500 μm.

When foams are to be coated, any material which is suitable for preparing hydrophobic foams can be used to prepare the foams. The most important factor is that the foam not be wet too well but that the surface be coated without the polymer penetrating into the body of the foam. Therefore, suitable materials from which the foam can be made include polymers in general because polymers are generally hydrophobic. Other suitable materials are glass foams since they also are not readily wet by water. The foams can be prepared by any suitable method.

It also has been found that the cell size (i.e., the largest linear dimension of the cells) of the foam or other cellular material should be less than about 500 μm and preferably less than about 200 μm in order to get the smooth coating polymer surface which when coated with metal or other suitable material gives a strong and very smooth outer surface. It has been found that the smaller the cell size, the better the results for the purposes of this invention.

A particularly useful foam suitable for use in this invention is a foam prepared from poly(4-methyl-1-pentene) by the method described in the article by A. T. Young et al., cited above, and in the recently filed patent application of A. T. Young which is also cited above. That reference and that patent application are hereby incorporated herein by reference.

In the method of the invention, the chosen hydrophobic cellular material is dipped into a wetting solution which consists essentially of a hydrophilic polymer and water.

The hydrophilic polymer can be any water-soluble film former. For example, polyvinyl alcohol, hydroxyethyl cellulose, hydroxypropyl cellulose, methyl cellulose, and carboxymethyl cellulose can be used. As described in the examples below, polyvinyl alcohol and hydroxypropyl cellulose have given good results. In some cases it may be necessary to add a small amount of surfactant to the solution to lower the surface tension to a desired value within the broad range as described below; but care must be taken so that the surface tension is not lowered too far.

In the method of the invention, in order to produce a smooth, thin polymer skin on the surface of the foam or other cellular material described above, it has been found that the wetting solution should have a surface tension within the range from about 35 to about 55 dynes/cm and a viscosity within the range from about 100 to about 3000 (cP). It is preferred that the surface tension be within the range from about 40 to about 50 dynes/cm and that the viscosity be within the range from about 100 to about 1000 cP. These two variables have been found to be critically important for closing the top surface of the pores of the cells of the foam or other cellular material without filling the pores. If the pores were filled, all of the advantages of a cellular material would be lost. When these two variables are chosen within the ranges recited above, a surface layer which is much like a skin forms to bridge the pores in the foam, uniformly wets the surface of the foam, and does not soak into the foam.

It is known also that the molar concentration of hydrophilic polymer:water in the wetting solution, the molecular weight of the polymer, and the temperature of the wetting solution determine the viscosity of the wetting solution (although varying these parameters generally has little effect on the surface tension after the initial addition of polymer). Therefore, these variables can be adjusted, as desired, provided that the resulting viscosity is within the range as described above.

Also when ICF targets are to be prepared, the foam which is chosen for use should have a very low density (e.g. about 0.005 g/cm$^3$ to about 0.2 g/cm$^3$) in order to keep the total mass of the structure as small as possible. A suitable foam for this use is that described above in the A. T. Young et al. reference cited above. The foam is cast, machined, or cut by any suitable procedure into the shape which is desired. This machining should produce as smooth a foam surface as possible. Therefore, use of a reinforcing agent as is described above in the A. T. Young et al. reference and patent application is desirable for this use. After the shape has been machined, the reinforcing agent should be removed, as is described in the A. T. Young patent and reference cited above.

The material which is used to coat over the polymer layer can be any substance which can be made to form a self-sustaining continuous layer on the surface of the polymer, which is not affected by the dissolving agents used in any subsequent step in the process, and which does not lead to destruction of the substrate material when the metal (or other material) is being applied. Examples of suitable materials are metals, semiconductors, and functional organic coatings.

Next the foam inside the ICF target can be removed, if desired, by dissolving it with any suitable solvent. Alternatively, if desired, the foam can be left in place. For ICF targets, when an open cell foam is used, the gas will permeate within the target (up to about 95% of the volume of the target); and therefore the foam need not be removed from inside the target provided that the foam has a low enough density so that the mass of the foam does not contribute appreciably to the mass of the target. And if the mass of the foam is low, it will probably dissolve quite readily, if removing the foam is desired. The polymer-coated structure can be coated with metal or other suitable material (described above) by any suitable method of obtaining a smooth coating, for example chemical vapor deposition, physical vapor deposition, or electrochemical or reactive chemical means.

Besides use as an ICF target, possible commercial application of the metal-coated foam (or other metal-coated cellular material) is in production of an integrated circuit or portions thereof directly onto a foam backing. It is well known in the art that thermal and vibrational problems cause major problems in integrated circuits. Therefore, depositing the integrated circuit onto a foam (or other cellular material) backing should provide thermal insulation from either an external or internal heat source. Additionally, because miniaturization and simplicity are very important factors in electronics technology and because miniaturization and simplicity are possible in the method of the invention, it is expected that an important use of the invention will be in the electronics industry because an integral coating on a flexible or pliable foam will provide protection against heat and against mechanical shock which might be encountered in the transport or use in fragile integrated circuits. Integrated circuits are normally made by vacuum deposition of conducting and semiconducting materials in complex patterns on non-conducting substrates. The use of thin layers of foam (coated as described in the invention with a continuous polymer layer) as a non-conducting substrate would give the circuit the thermal and shock protection discussed above. The present invention allows for the deposition of coherent conducting or semiconducting layers on a low density cellular base.

Another use of the invention is expected to be as solar reflectors. In the prior art, these structures have often been made by coating a metal (for example, aluminum) onto a thin polymer film. However, the metal/film laminate lacks rigidity and therefore generally must be attached to a structural support. In the present invention, on the other hand, if a suitable foam or other cellular material is chosen, the foam to which the polymer and metal are attached will provide both support and structural rigidity, thus reducing the need for supplementary supporting structures and reducing the overall weight and complexity of solar devices.

Examples of articles of manufacture which are made by the method of the invention, therefore, include ICF targets, integrated circuits, solar reflectors, and solar collectors.

EXAMPLES

The following examples were carried out and illustrate various aspects of the invention. Scanning electron microscopy (SEM) and visual inspection were both used to examine each sample after treatment. In the successful coatings, the smoothness was such that a continuous noncellular surface appearance was observed under magnifications which would make the cellular nature of the untreated foam readily apparent. Many of the SEM's have been made available to the public in the article by Barry L. Barthell et al., "Vacuum Deposition of High Quality Metal Films on Porous Substrates," J. Vac. Sci. Technol. 20(4), April 1982; and that article is hereby incorporated herein by reference.

EXAMPLE 1

A cylinder of open cell microporous foam with an average pore size of 25 μm was coated with the solution of sodium carboxymethyl cellulose (CMC) and water by a simple dipping process. The solution had a viscosity of 180 cP and a surface tension of 68 dynes/cm. The concentration of CMC:water was 5 percent. As the cylinder was withdrawn the solution beaded up into small blotches on its surface and did not form a continuous coating. This is illustrated by the appearance of the cylinder on the left in FIG. 1a of the Barthell article cited above.

EXAMPLE 2

The above experiment was repeated except that the solution used consisted of a low molecular weight polymer of hydroxypropyl cellulose dissolved in methanol. This solution had a viscosity of 270 cP. Due to the properties of the organic solvent, this fluid had a surface tension of only 27 dynes/cm. At this low surface tension, the polymer solution soaked into the foam all the way to the core of the cylinder. The cylinder treated in this experiment is shown on the right in FIG. 1a of the Barthell article cited above. All of the coating solutions had been colored to the same intensity with a red dye to enhance visual observations. The dark color of the cylinder described in this example thus is indicative of the excessive amount of polymer solution picked up by the cylinder. FIG. 1d in the Barthell article cited above shows a scanning electron micrograph (SEM) of the surface of this cylinder. The surface is seen to be still porous and cellular.

EXAMPLE 3

The technique of Example 1 was repeated, but now a solution of polyvinyl alcohol in water with a viscosity of 480 cP and a surface tension of 45 dynes/cm was used as the coating fluid. The relative concentration of polyvinyl alcohol:water in the solution was 20 percent and the temperature of the solution was 25° C. The cylinder treated in this manner is shown in the center of FIG. 1a of the Barthell article cited above. In this case, it is clear that the surface of the foam has been completely coated but that essentially no penetration has taken place. FIG. 1c of the Barthell article cited above shows an SEM of the surface of the cylinder treated in this example. From that figure, it is obvious that the pores of the foam have been closed. FIG. 4a of the Barthell article cited above shows the same cylinder in cross-sectional view. The layer of polymer coating on the surface is seen to be about 10–20 μm thick with no penetration into the body of the foam. This example illustrates a preferred embodiment of the invention.

EXAMPLE 4

The process of Example 1 was repeated using a solution of hydroxypropyl cellulose in water with a viscosity of 1300 cP and a surface tension of 45 dynes/cm as the coating liquid. The relative concentration of hydroxypropyl cellulose:water in the solution was 15 percent and the temperature of the solution was 25° C. FIG. 2a of the Barthell article cited above shows the surface and FIG. 4b of that article shows a cross-section view of a cylinder treated in this manner. As can be seen in those figures, this solution formed a uniform coating without penetration into the body of the cylinder. This example represents another preferred embodiment of the invention.

EXAMPLE 5

The process of Example 1 was again repeated but this time with a solution of polyvinyl alcohol in water with a viscosity of 30 cP and a surface tension of 45 dynes/cm. The relative concentration of polyvinyl alcohol:water was 10 percent and the temperature of the solution was 25° C. FIG. 3 of the Barthell article is an SEM of the surface of foam coated in this example. This example illustrates that a solution too low in viscosity does not have enough body (i.e., thickness and coherence) to form the required continuous film over all the cells on the surface of the foam.

EXAMPLE 6

The process of Example 1 was again used, except that the solution used was a medium molecular weight hydroxypropyl cellulose in methanol solution with a viscosity of 3000 cP and a surface tension of 28 dynes/cm. The foam treated in this example is shown in FIG. 2b of the Barthell article cited above. Even at this high viscosity, a fluid with a low surface tension readily penetrates into the foam and does not form a smooth skin on the surface.

EXAMPLES 7–9

In these examples, the process of Example 1 was repeated but an open cell polyurethane foam was coated. This foam had a large cell size (about 500 μm). When a solution of CMC in water (having a viscosity of 180 cP and a surface tension of 68 dynes/cm) was used to coat this foam (Example 7) beading occurred, although not to the same extent as found in Example 1. When a solution of hydroxypropyl cellulose in methanol (having a viscosity of 270 cP and a surface tension of 27 dynes/cm) was used (Example 8), penetration into the foam body took place although this penetration extended only to a depth of about ⅛ of an inch. When hydroxypropyl cellulose in water (Example 9) having a viscosity of 1300 cP and a surface tension of 45 dynes/cm was used as the coating fluid, more uniform wetting occurred than in Example 7, but no penetration into the foam took place. The large cells of this foam were not bridged by the solution in Example 9. It is likely that at a sufficiently high viscosity, a coating solution with the proper surface tension value might adequately coat large celled foam such as this, but excessively high viscosity fluids present problems of flow and leveling (wherein the surface formed after evaporation of the solvent tends to be wavy or lumpy). The foam used in Examples 7–9 is not as hydrophobic as the foams used in the other examples included in this application, but the effect of surface tension on coating fluid behavior (even though less than in the previous examples) is still present.

EXAMPLES 10–12

The procedure of Example 1 was again repeated in these examples, but the polymer foam used was closed cell polystyrene with a cell size of about 500 μm. A solution of CMC in water having a viscosity of 180 cP and a surface tension of 68 dynes/cm failed to completely wet the surface of the polystyrene foam (Example 10), whereas solutions of polyvinyl alcohol in water having a viscosity of 480 cP and a surface tension of 45 dynes/cm (Example 11) and of hydroxypropyl cellulose in methanol having a viscosity of 270 cP and a surface tension of 27 dynes/cm (Example 12), respectively, did uniformly wet the polystyrene foam. SEM's were taken of the surfaces coated in these three examples; and it appeared that the water solution gave a smoother surface than the organic solution. It is believed that this difference may be related to the surface tension values of the two film-forming solutions. Although the water-based coating did not close all the pores on the surface of the polystyrene, it is expected that it would have done so if the viscosity of the solution had been only marginally higher or if the pore size of the foam had been somewhat smaller. These examples illustrate that the method of the invention is applicable to closed-cell, as well as open-cell, foams.

EXAMPLES 13–15

The procedure of Example 1 was again repeated in these examples, but the coatings were applied to a closed-cell polyethylene foam with a cell size greater than 500 $\mu$m. Again the solution of CMC in water having a viscosity of 180 cP and a surface tension of 68 dynes/cm failed to uniformly wet the foam surface (Example 13). However, polyvinyl alcohol in water having a viscosity of 480 cP and a surface tension of 45 dynes/cm (Example 14) and hydroxypropyl cellulose in methanol having a viscosity of 270 cP and a surface tension of 27 dynes/cm (Example 15) wet the surface of the foam uniformly. An SEM was taken of the surface coated in Example 14 and showed that the surface film apparently cracked upon drying, perhaps from the stress of being applied thinly across such large pores. The coating applied in Example 15 was observed in an SEM and did not exhibit this cracking to such a large extent, although some breaks were present. These examples illustrate the difficulties encountered when foams with very large cell sizes are to be coated.

The foregoing description of the preferred embodiment of the invention have been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular uses contemplated. It is intended that the scope of the invention be defined by the claims appended hereto.

What is claimed is:

1. A method of forming a thin, smooth continuous skin of a hydrophilic polymer on the outer surface of a hydrophobic cellular material, said method comprising:
    (a) coating said outer surface said cellular material, which has an average cell size less than about 500 $\mu$m, in a wetting solution of said hydrophilic polymer and water, wherein said wetting solution has a surface tension within the range from about 35 to about 55 dynes/cm and a viscosity within the range from about 100 to about 3000 cP;
    (b) removing said cellular material from said wetting solution and allowing the excess wetting solution to drain away from said cellular material; and
    (c) drying the wetted surface of said cellular material to thereby remove by evaporation the water in the wetting solution on said surface, thereby forming a smooth continuous layer of said hydrophilic polymer on the outer surface of said cellular material.

2. A method according to claim 1, wherein said hydrophobic cellular material is a polymer foam.

3. A method according to claim 2, wherein the surface tension of said wetting solution is within the range from about 40 to about 50 dynes/cm and wherein the cell size of said polymer foam is less than about 200 $\mu$m.

4. A method according to claim 3, wherein the viscosity of said wetting solution is within the range from about 100 to about 1000 cP.

5. A method according to claim 4 wherein said hydrophobic foam is poly(4-methyl-1-pentene).

6. A method according to claim 5, wherein said hydrophilic polymer is polyvinyl alcohol.

7. A method according to claim 5, wherein said hydrophilic polymer is hydroxypropyl cellulose.

8. A method of producing an arbitrarily shaped structure having a smooth exterior layer of metal and an interior structure comprising a hydrophobic cellular material, said method comprising:
    (a) forming a hydrophobic foam having a cell size less than about 500 $\mu$m into a chosen shape;
    (b) coating said chosen shape with a hydrophilic polymer according to the method of claim 2, so as to form a polymer-coated shape;
    (c) applying a coating of metal to said polymer coated shape.

9. A method according to claim 8, wherein the formed structure of foam is removed by dissolving the foam after step (c).

10. A method of forming an inertial confinement fusion target comprising the method according to claim 8, wherein the foam used has a density within the range from about 0.005 g/cm$^3$ to about 0.2 g/cm$^3$.

* * * * *